United States Patent
Kanbe et al.

(10) Patent No.: US 6,830,837 B2
(45) Date of Patent: Dec. 14, 2004

(54) MAGNETIC RECORDING MEDIUM AND MAGNETIC RECORDING APPARATUS

(75) Inventors: Tetsuya Kanbe, Odawara (JP); Hiroyuki Suzuki, Fujisawa (JP); Yotsuo Yahisa, Odawara (JP); Yoshiyuki Hirayama, Kokubunji (JP); Hidekazu Kashiwase, Yokohama (JP)

(73) Assignee: Hitachi Global Storage Technologies Japan, Ltd., Kanagawa-Ken (JP)

( * ) Notice: Subject to any disclaimer, the term of this patent is extended or adjusted under 35 U.S.C. 154(b) by 25 days.

(21) Appl. No.: 10/046,987

(22) Filed: Jan. 17, 2002

(65) Prior Publication Data

US 2003/0148143 A1 Aug. 7, 2003

(30) Foreign Application Priority Data

Sep. 7, 2001 (JP) .......................... 2001-271770

(51) Int. Cl.$^7$ ............... G11B 5/66; G11B 5/70; C25D 5/10; H01J 1/00; B32B 15/00
(52) U.S. Cl. .............. 428/694 TM; 428/694 TS; 428/611; 428/667; 428/668; 428/900
(58) Field of Search ................ 428/694 TM, 900, 428/694 TS, 611, 667, 668

(56) References Cited

U.S. PATENT DOCUMENTS

| | | | |
|---|---|---|---|
| 5,399,386 A | * | 3/1995 | Jahnes et al. ............... 427/531 |
| 6,280,813 B1 | * | 8/2001 | Carey et al. ................ 428/65.3 |
| 6,506,508 B1 | * | 1/2003 | Yoshida et al. ......... 428/694 TS |
| 2003/0104263 A1 | * | 6/2003 | Osawa et al. ......... 428/694 TM |

FOREIGN PATENT DOCUMENTS

| | | |
|---|---|---|
| JP | 2001-56924 | 2/2001 |
| JP | 2001-148110 | 5/2001 |

OTHER PUBLICATIONS

Applied Physics Letters, vol. 77, No. 16, "Longitudinal Magnetic Recording Media with Thermal Stabilization", E. Abarra et al, Oct., 2000, pp. 2581–2583.
Applied Physics Letters, vol. 77, No. 23, "Antiferromagnetically Coupled Magnetic Media Layers for Thermally Stable High–Density Recording", E. Fullerton et al, Dec. 4, 2000, pp. 3806–3808.
Journal of Magnetism and Magnetic Materials, vol. 127, 1993, pp. 233–240.

* cited by examiner

Primary Examiner—Holly Rickman
(74) Attorney, Agent, or Firm—Mattingly, Stanger & Malur, P.C.

(57) ABSTRACT

It is an object of the present invention to provide a high reliability magnetic storage apparatus capable of performing writing and reading back of high density information. The magnetic storage apparatus is so configured as to have a longitudinal magnetic recording medium including: a magnetic layer formed on a non-magnetic substrate via a plurality of underlayers; the magnetic layer including a lower magnetic layer containing Ru in an amount of not less than 3 at % to not more than 30 at %, and Cr in an amount of not less than 0 at % to not more than 18 at %, and further containing at least one of B or C in an amount of not less than 0 at % to not more than 20 at %, and an upper magnetic layer containing Co as a main component disposed thereon via a non-magnetic intermediate layer.

23 Claims, 4 Drawing Sheets

SUBSTRATE CARRIER DIRECTION

FIG. 5a
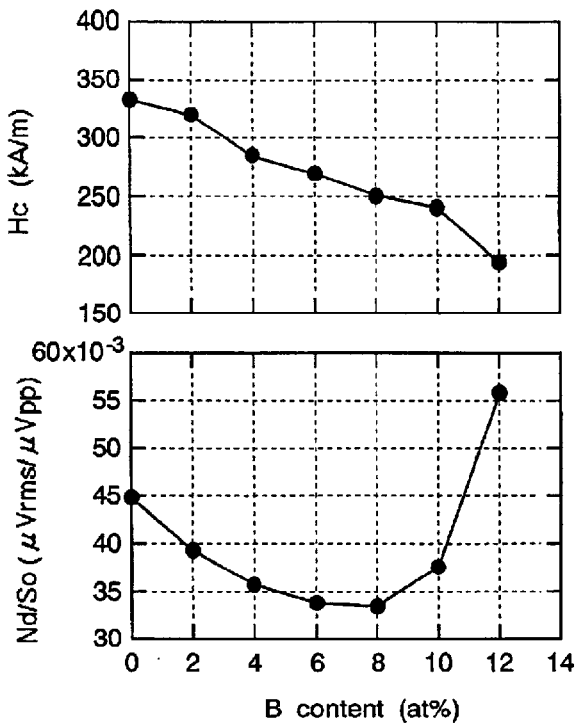
FIG. 5b
FIG. 6
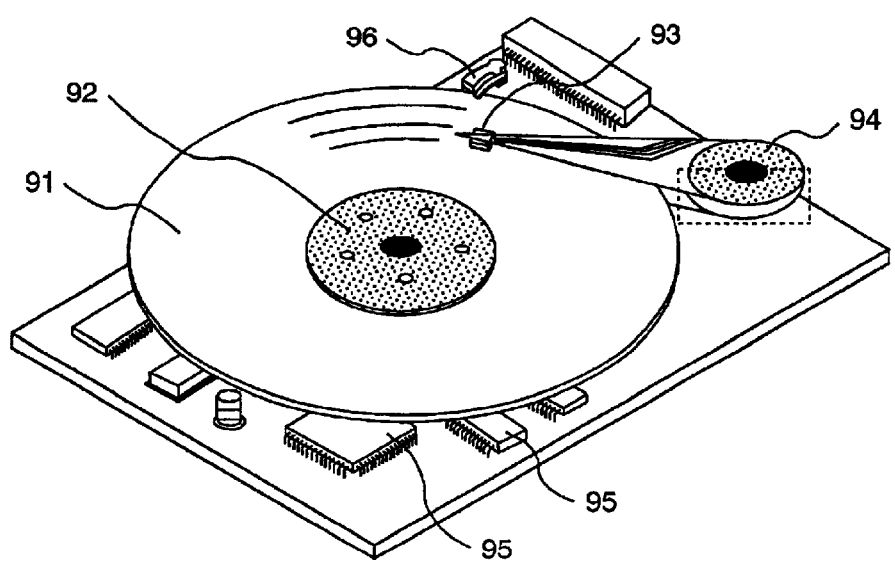

MAGNETIC RECORDING MEDIUM AND MAGNETIC RECORDING APPARATUS

BACKGROUND OF THE INVENTION

1. Field of the Invention

The present invention relates to a magnetic recording medium and a magnetic storage apparatus. More particularly, it relates to a technology of a longitudinal magnetic recording medium which has a low noise and a high coercivity, and is also sufficiently stable against thermal fluctuation. Further, it relates to a technology of a high reliability magnetic storage apparatus having an areal recording density of 50 megabits per square millimeter or more, which has been implemented by combining the longitudinal magnetic recording medium technology with a technology of a high sensitivity magnetic head, and optimizing the read/write conditions.

2. Description of the Related Art

In recent years, there is an increasingly growing demand for an improvement in areal recording density of a magnetic recording medium with an increase in capacity of a magnetic recording disk drive. A reduction in media noise is indispensable for improving the areal recording density. To that end, the grain size of a magnetic layer is required to be made fine for increasing the number of grains per bit. However, microfine magnetic crystal grains show a tendency to generate magnetization reversal due to the influence of thermal fluctuation. Accordingly, the decay of recorded magnetization, that is, the thermomagnetic relaxation phenomenon becomes noticeable. In order to suppress the thermomagnetic relaxation phenomenon, the thermal stability factor ($Ku \cdot v/kT$) is required to be kept at generally 80 to 90 or more, wherein Ku is the crystal magnetic anisotropy constant, v is the volume of a magnetic crystal grain, k is the Boltzmann constant, and T is the absolute temperature. When the magnetic crystal grain has been made fine, the grain volume v is reduced. Accordingly, Ku is required to be raised for keeping $Ku \cdot v/kT$ at not less than the aforesaid value. If Ku is improved, the anisotropy field (Hk) is also increased. If the Hk exceeds the recording magnetic field from a magnetic head, however, the overwrite characteristic is largely deteriorated. For this reason, the Hk of the medium is required to be set so as not to exceed the recording magnetic field from the head. This requirement decides the upper limit on the Ku value.

As a technology for ensuring compatibility between the suppression of thermomagnetic relaxation and a reduction in noise, an anti-ferromagnetically coupled medium has been proposed in recent years (Appl. Phys. Lett., vol. 77, pp. 2581–2583, October (2000), and Appl. Phys. Lett., vol. 77, pp. 3806–3808, December (2000)). This medium is so configured that a magnetic layer portion has a double-layered structure in which respective magnetic layers are anti-ferromagnetically coupled via a Ru intermediate layer therebetween. In the anti-ferromagnetically coupled medium, the magnetization of a magnetic layer (lower magnetic layer) on the substrate side and the magnetization of another magnetic layer (upper magnetic layer) on the protective layer side are oriented in antiparallel to each other in the residual magnetization state. For this reason, when the product ($Br \cdot t$) of the residual magnetic flux density (Br) and the magnetic layer thickness (t) is made equal to that of the medium using a magnetic layer of a single-layered structure, it is possible to increase the thickness of the upper magnetic layer which is a recording layer. Thus, it is possible to raise the thermal stability factor ($Ku \cdot v/kT$) of the magnetic layer.

However, the foregoing technology falls short of specifically providing a longitudinal magnetic recording medium which has a low noise and a high coercivity, and is also sufficiently stable against thermal fluctuation.

SUMMARY OF THE INVENTION

It is an object of the present invention to provide a longitudinal magnetic recording medium which has a low noise and a high coercivity, and is also sufficiently stable against thermal fluctuation. In addition, it is another object to provide a high reliability magnetic storage apparatus having an areal recording density of 50 megabits per square millimeter or more by combining the longitudinal magnetic recording medium with a high sensitivity magnetic head, and optimizing the read/write conditions.

In order to achieve the foregoing objects, in accordance with the present invention, the longitudinal magnetic recording medium has been so configured that a magnetic layer is formed on a non-magnetic substrate via a plurality of underlayers, wherein the magnetic layer is made up of a lower magnetic layer containing at least one of Ru or Re in an amount of not less than 3 at % to not more than 30 at %, and Cr in an amount of not less than 0 at % to not more than 18 at %, and further containing at least one of B or C in an amount of not less than 0 at % to not more than 20 at %, and the balance being made up of Co, and an upper magnetic layer containing Co as a main component disposed thereon via a non-magnetic intermediate layer.

Further, the plurality of the underlayers has been so configured as to include a non-magnetic and amorphous structured first underlayer containing Co or Ni as a main component, and a body-centered cubic structured second underlayer containing Cr.

Further, a B2 structured alloy material may also be used for the first underlayer.

Still further, at least one layer of the plurality of the underlayers has been so configured as to be made of a non-magnetic and hexagonal close-packed structured alloy material containing Co.

Furthermore, it is also possible that the Co-containing alloy underlayer is formed as a third underlayer between the lower magnetic layer and the second underlayer.

Further, the underlayer made of a non-magnetic and hexagonal close-packed structured alloy material containing Co has been so configured as to be made of a Co—Ru alloy containing Ru in an amount of not less than 35 at % to not more than 60 at %.

Still further, at least one layer of the plurality of the underlayers have been so configured as to be made of a Cr-containing body-centered cubic structured alloy material, wherein the Cr alloy contains B in an amount of not less than 2 at % to not more than 15 at %.

Furthermore, in a magnetic storage apparatus having: a magnetic recording medium; a driver for driving it in the recording direction; a composite head having an inductive magnetic head for recording and a spin-valve type magnetic head for reading in combination; a means for causing the head to perform relative movement with respect to the medium; and a read/write signal processing means with respect to the head, the magnetic recording medium has been allowed to be configured with the longitudinal magnetic recording medium.

BRIEF DESCRIPTION OF THE DRAWINGS

FIGS. 5(A) and 5(B) are graphs respectively showing the relationships of the coercivity, and the normalized media noise with the B content of the underlayer of a medium of one example of the present invention;

FIG. 6 is a perspective view showing one example of a magnetic storage apparatus of the present invention;

DETAILED DESCRIPTION OF THE PREFERRED EMBODIMENTS

Figure 1:
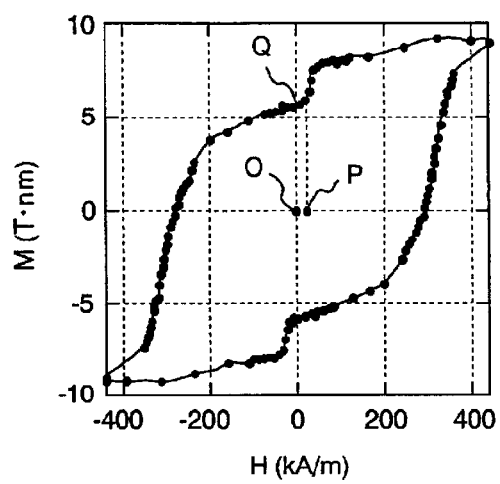
FIG. 1 is a graph showing a hysteresis loop of a medium of one example of the present invention.

First, a brief description will be given to the embodiments of the present invention.

In an anti-ferromagnetically coupled medium which is an example of a magnetic recording medium of the present invention, the product (Br·t) of the residual magnetic flux density (Br) and the magnetic layer thickness (t) is generally the difference between the Br·t of an upper magnetic layer and the Br·t of a lower magnetic layer. For this reason, when the Br·t of the anti-ferromagnetically coupled medium is equally matched with the Br·t of a single magnetic layer medium using the same magnetic alloy as that of the upper magnetic layer, the Br·t of the upper magnetic layer may be set larger by the Br·t of the lower magnetic layer. The Br·t of the upper magnetic layer can be increased by mainly increasing the saturation magnetic flux density (Bs) or the thickness of the magnetic layer. In the former case, it is possible to increase the crystal magnetic anisotropy constant (Ku) if the anisotropy field (Hk) is not reduced. In the latter case, it is possible to increase the volume of the crystal grain (v). In consequence, it becomes possible to increase the thermal stability factor (Ku·v/kT) (k: Boltzmann constant, and T: the absolute temperature) of the upper magnetic layer. In the anti-ferromagnetically coupled medium, the upper magnetic layer serves as a recording layer. Therefore, by improving the thermal stability of the magnetic layer, it is possible to suppress the thermomagnetic relaxation phenomenon.

Accordingly, by setting the Br·t of the lower magnetic layer at a large value, it is also possible to set the Br·t of the upper magnetic layer at a large value. As a result, it is possible to more improve the thermal stability. However, in the anti-ferromagnetically coupled medium, the magnetization of the lower magnetic layer must be oriented in anti-parallel to the magnetization of the upper magnetic layer in the residual magnetization state. To that end, the coercivity (Hc2) of the lower magnetic layer is required to be made smaller than the coupled magnetic field (Hex2) applied on the lower magnetic layer. The Hex2 can be generally described as J/(Br·t2) by using the exchange coupling constant (J) between the upper magnetic layer and the lower magnetic layer, and the Br·t (Br·t2) of the lower magnetic layer. For this reason, the Br·t2 is required to be not more than the J/Hc2 for satisfying the foregoing conditions. Therefore, in order to increase the Br·t2 as large as possible, it suffices that the J is increased, or that the Hc2 is decreased.

In order to decrease the Hc2, it is effective to use a material having a small anisotropy field (Hk) for the lower magnetic layer. The general materials currently used for the magnetic layer are hcp structured alloys each containing Co as a main component, and Cr, Pt, or the like, such as Co—Cr—Pt—B and Co—Cr—Pt—Ta alloys. The Hk of each of these Co alloys mainly depends upon the Pt content, so that it is possible to reduce the Hk by reducing the Pt content.

However, the atomic radius of Pt is larger as compared with that of Co by about 11%. Therefore, when the Pt content of the lower magnetic layer is reduced, the lattice constant of the magnetic layer is also largely reduced at the same time. Since the upper magnetic layer contains Pt in an amount of 10 to 18 at % as described later, an extreme reduction in the Pt content of the lower magnetic layer results in a significant increase in degree of the lattice misfit between both the magnetic layers. As a result, the epitaxial growth of the upper magnetic layer is prevented, thereby entailing the problem that the in-plane magnetic anisotropy is largely reduced. In order to avoid this problem, the material having a low Hk, but having a lattice constant which has not been largely reduced as compared with that of the upper magnetic layer is preferably used for the lower magnetic layer. The present inventors have conducted a study on various materials for the lower magnetic layer. As a result, they have found that the alloy containing Co as a main component, and containing Ru or Re in place of Pt is most desirable. Although the atomic radius of each of Ru and Re is smaller than that of Pt, it is 68% larger relative to that of Co.

Further, even if each of these elements is alloyed with Co, the Hk is not increased. Therefore, the Co—Ru alloy or the Co—Re alloy can ensure the compatibility between a high lattice constant and a low Hk. As a result of the study, it has been indicated that the lower magnetic layer may contain Ru or Re in an amount of generally 3 at % or more in order not to prevent the good epitaxial growth of the upper magnetic layer. However, when each of these elements is added in a large amount, the amount of magnetization of the lower magnetic layer is remarkably reduced. Therefore, the content is desirably 30 at % or less.

Further, Cr may also be added in an amount of 18% or less in order to adjust the amount of magnetization. Since Cr has almost the same atomic radius as that of Co, it is capable of adjusting only the amount of magnetization without changing the lattice constant. However, if the amount of Cr added exceeds 18%, the amount of magnetization is remarkably reduced. In consequence, the effect of canceling the Br·t of the upper magnetic layer is undesirably reduced.

Further, since the grain size of the upper magnetic layer highly depends upon the grain size of the lower magnetic layer, it is possible to make fine the grain size of the upper magnetic layer by making fine the grain side of the lower magnetic layer. This case is preferable because the media noise can be reduced. In order to make fine the grain size of the lower magnetic layer, the magnetic layer desirably contains B or C in an amount of not less than 0 at % to not more than 20 at %. If the addition amount exceeds 20 at %, the crystalline structure of the lower magnetic layer undesirably undergoes remarkable deterioration.

The thickness of the lower magnetic layer is desirably set at 1 nm or more. If it is less than 1 nm, the Br·t of the lower magnetic layer is too small. Accordingly, the Br·t of the upper magnetic layer cannot be set large enough for withstanding the thermal fluctuation.

Whereas, in general, when the lower magnetic layer is increased in thickness, the coercivity of the magnetic layer increases. For this reason, if the thickness exceeds a given value, the coercivity of the lower magnetic layer becomes larger than the coupled magnetic field applied on the magnetic layer. As a result, the magnetizations of the upper magnetic layer and the lower magnetic layer are not oriented in antiparallel to each other in the residual magnetization state. Consequently, the thickness at this stage becomes the upper limit of the thickness of the lower magnetic layer. The lower magnetic layer of the present invention has an extremely low Hk, and hence it also has a low coercivity. Accordingly, even if it is increased in thickness to about 12 nm, it is possible to cause the magnetizations of the upper magnetic layer and the lower magnetic layer to be oriented in antiparallel to each other in the residual magnetization state. The correlation between the thickness of the lower magnetic layer and the electromagnetic transfer characteristic varies according to the material of the upper magnetic layer and the underlayer configuration. Therefore, it is desirable that the thickness of the lower magnetic layer is optimized within a range of 1 nm to 12 nm according to the media configuration.

For the upper magnetic layer, it is desirable to use a hcp structured alloy containing Co as a main component, and containing Cr, Pt, B, or the like, such as CoCrPtB, CoCrPtTa, CoCrPtBCu, or CoCrPtBTa alloy. In order to sufficiently reduce the exchange interaction between magnetic grains, the Cr concentration of the upper magnetic layer is desirably 14 at % or more. However, if the Cr concentration is increased, the crystal magnetic anisotropy constant (Ku) is reduced, resulting in a decrease in thermal stability factor (Ku·v/kT). Therefore, the Cr content is desirably 22 at % or less.

Further, in order to ensure the compatibility between a high coercivity and a good overwrite characteristic, Pt is desirably contained therein in an amount of not less than 10 at % to not more than 18 at %. Still further, if B is added in an amount of 3 at % or more, the magnetic crystal grains are made fine, and at the same time, the grain boundary segregation of the Cr atoms is promoted. Accordingly, it is possible to largely reduce the media noise. However, since the addition of a large amount of B deteriorates the crystalline structure of the magnetic layer, the addition amount is desirably 18 at % or less. The media noise can also be reduced by adding Ta, Cu, Mo, Zr, W, Ti, $SiO_2$, $TiO_2$, $ZrO_2$, $Al_2O_3$, or the like to the upper magnetic layer. The addition of each of the aforesaid elements or compounds disturbs the hcp structure of the magnetic layer. Therefore, the addition amount is preferably set at 10 at % or less, or 6 mol % or less.

As the intermediate layer formed between the lower magnetic layer and the upper magnetic layer, a 0.2 nm–0.8 nm-thick Ru layer is desirably used. If the Ru layer thickness departs from the aforesaid range, the anti-ferromagnetic coupling between the lower magnetic layer and the upper magnetic layer undesirably is disturbed. As the materials for the intermediate layer, any materials other than Ru present no problem so long as they are capable of introducing the anti-ferromagnetic coupling between the lower magnetic layer and the upper magnetic layer.

As the layer configuration of the underlayer, for example, there may be adopted the multi-layered configuration in which a bcc structured second underlayer containing Cr is stacked on a first underlayer made of a non-magnetic and amorphous alloy containing Co, Ni, or the like as a main component. For the first underlayer, for example, there may be desirably used a Co—Crx1-Zry1 (x1: 30 to 60 at %, and y1: 3 to 30 at %), Ni—Crx2-Zry2 (x2: 0 to 50 at %, and y2: 3 to 60 at %), or Ni—Tax3-Zry3 (x3: 3 to 60 at %, and y3: 3 to 60 at %), Ni—Tax4 (x4: 5 to 60 at %) alloy, or the like. In this case, the grain size of the second underlayer is made fine, and at the same time, it is possible to cause the underlayer to exhibit such an orientation that the (100) plane is generally parallel to the substrate surface (hereinafter, referred to as (100) orientation).

Therefore, the lower magnetic layer formed on the second underlayer exhibits such an orientation that the (11.0) plane is generally parallel to the substrate surface (hereinafter, referred to as (11.0) orientation) by epitaxial growth. The upper magnetic layer also exhibits the (11.0) orientation via the intermediate layer. Accordingly, the grain size of the upper magnetic layer is made fine down to 11 nm or less, suitable for noise reduction, and at the same time, the c-axis in-plane component is improved. In consequence, it is possible to obtain a medium having a low noise and a strong in-plane magnetic anisotropy. The first underlayer is desirably non-magnetic. However, even if it has a slight magnetization, there is no problem from the practical viewpoint so long as the saturation magnetic flux density is 0.15 T or less.

Further, the first underlayer is not required to have an accurate amorphous structure so long as it does not exhibit a distinct diffraction peak other than a halo pattern in the X-ray diffraction spectrum, or the mean grain size obtained from the lattice image photographed by a high resolution electron microscope is 5 nm or less. Even the materials for the first underlayer other than those described above have no particular restriction so long as they are the materials capable of causing the second Cr alloy underlayer to exhibit the (100) orientation, such as MgO, NiP, Ta, or the like. Whereas, when a NiP-plated Al—Mg alloy is used for a substrate, the Cr alloy layer directly formed on the substrate is (100) oriented, so that particularly, the first underlayer is not required to be formed.

For the second underlayer, there may be used bcc structured Cr, Cr—Ti alloy, Cr—Mo alloy, Cr—V alloy, Cr—W alloy, Cr—Mn alloy or the like. The Cr alloy is preferred since the lattice matching with the magnetic layer is improved because of its larger lattice constant as compared with that of pure Cr. Further, B may also be added thereto in order to make finer the grain size of the second underlayer. In this case, the grain size of the magnetic layer is also made finer, so that it is possible to further reduce the media noise. However, the addition of B deteriorates the crystalline structure of the underlayer simultaneously with making finer the grain size of the underlayer. Therefore, B is desirably added in an amount of 15 at % or less. Especially when the amount of B added exceeds 5 at %, for example, the second underlayer may also be configured in double layered structure by forming a Cr layer not containing B, and then forming a CrTiB layer thereon, or the like. As a result, it is possible to implement the underlayer which has ensured the compatibility between the microfine grain size and the strong (100) orientation.

The lower magnetic layer may be formed directly on the second underlayer. Alternatively, a Co-containing hcp structured non-magnetic alloy layer may also be provided between the second underlayer and the magnetic layer as a third underlayer. In this case, the lower magnetic layer is epitaxially grown on the underlayer having the same crystal structure (hcp structure) Therefore, it undergoes good crystal growth from the initial growth state. For this reason, the crystalline structure of the upper magnetic layer and the in-plane orientation of the c-axis are also improved, so that it is possible to obtain a medium having a high coercivity. The material for the third underlayer has no particular restriction so long as it is an alloy material having a hcp structure and a saturation magnetic flux density of 0.15 T or less, such as a Co—Cr alloy or a Co—Cr—Pt alloy. However, when a Co—Ru alloy containing Ru in an amount of not less than 35 at % to not more than 60 at % is used, particularly desirably, the lattice matching is improved, so that it is possible to reduce the media noise.

The aforesaid underlayer configuration causes all the magnetic layers to have the (11.0) orientation. However, the orientation of the magnetic layer may be the (10.0) orientation with the c-axis of the magnetic alloy facing in the in-plane direction as with the (11.0) orientation. In order for the magnetic layer to have the (10.0) orientation, a B2 structured alloy such as a Ni-50 at % Al alloy may be desirably used for the first underlayer. In this case, the second underlayer mainly exhibits the (211) orientation, and hence the third underlayer and the magnetic layer have the (10.0) orientation due to epitaxial growth. Even in the case in which the magnetic layer is (10.0)-oriented, the same effect as that for the (11.0) orientation can be obtained by using an alloy material containing Co as a main component, and containing Ru, Cr, B, or C of the present invention for the lower magnetic layer.

By forming a nitrogen-doped carbon layer with a thickness of 3 nm to 7 nm as a protective layer, and further providing a lubricant layer of adsorptive perfluoroalkylpolyether, or the like with a thickness of 1 nm to 4 nm, it is possible to obtain a high reliability magnetic recording medium capable of performing high density recording. Further, if a hydrogen-doped carbon layer, or a layer made of a compound such as silicon carbide, tungsten carbide, (W—Mo)—C, or (Zr—Nb)—N, or a mixed layer of any of the compounds and carbon is used as the protective layer, preferably, the durability and the corrosion resistance can be improved.

As the substrate, there may be used, other than chemically reinforced aluminosilicate, ceramics made of soda-lime glass, silicon, borosilicate glass, or the like, glass-glazed ceramics, Ni—P electroless plated Al—Mg alloy substrate, Ni—P sputtered glass substrate, or rigid substrate made of Ni—P electroless plated glass, etc., or the like.

As for the magnetic characteristics of the anti-ferromagnetically coupled medium of the present invention, it is desirable that the coercivity is not less than 240 kA/m (3,024 Oe) to not more than 400 kA/m (5,040 Oe), and that the residual magnetization (Br·t) is not less than 2.0 Tnm (20G·μm) to not more than 6.0 Tnm (60G·μm). Herein, the residual magnetization is generally the value obtained by subtracting the Br·t of the lower magnetic layer from the Br·t of the upper magnetic layer, and it is the value corresponding to O·Q of FIG. 1. If the coercivity is less than 240 kA/m, the recording resolution is reduced. Whereas, if it exceeds 400 kA/m, the overwrite characteristic is deteriorated. Thus, both the cases are undesirable.

Further, if the residual magnetization is less than 2.0 Tnm, the read output is reduced. Whereas, if it exceeds 6.0 Tnm, high resolution cannot be obtained. Thus, both the cases are undesirable.

The graph of FIG. 1 shows one example of the hysteresis loop of the anti-ferromagnetically coupled medium of the present invention. The magnetization of the lower magnetic layer is required to be oriented in antiparallel to the magnetization of the upper magnetic layer in the residual magnetization state. For this reason, the magnetic field at which the magnetization reversal of the lower magnetic layer is completed (point P) must be a positive value. Further, in order to sufficiently suppress the thermomagnetic relaxation phenomenon, the thermal stability factor (Ku·v/kT) is desirably 80 to not less than 90. The thermal stability factor can be determined by fitting the time dependence of the remanence coercivity in the Sharrock's equation as described in, for example, J. Magn. Magn. Mater. 127, p. 233 (1993). From the study by the present inventors, it has been concluded as follows: if the Ku·v/kT at room temperature determined in this manner is 80 to not less than 90, the decay in read output at 5 years later is estimated to be 10% or less, thus presenting no problem in terms of reliability.

Further, in a magnetic storage apparatus having a magnetic recording medium, a driver for driving it in the recording direction, a magnetic head made up of a write element and a read element, a means for causing the magnetic head to perform relative movement with respect to the magnetic recording medium, and a read/write signal processing means for performing the signal input to the magnetic head and the output signal read-back from the magnetic head, by using any of the aforesaid media for the magnetic recording medium, it is possible to provide a high reliability magnetic storage apparatus having an areal recording density of 50 Mbit/mm$^2$ or more.

Namely, the read element of the magnetic head is configured with a spin-valve type sensor including a plurality of conductive magnetic layers of which mutual magnetization directions are relatively changed by the external magnetic field to generate a large resistance change, and conductive non-magnetic layers disposed each between the conductive magnetic layers. The sensor element is desirably formed between the two shield layers made of a soft magnetic material separated by a distance of 0.10 μm or less from one another. This is attributable to the following fact. Namely, if the distance between shields is 0.10 μm or more, the resolution is reduced, so that the phase jitter of a signal increases. By implementing the aforesaid configuration of the storage apparatus, it is possible to further raise the signal intensity. As a result, it becomes possible to implement a high reliability magnetic storage apparatus having a recording density of 50 Mbit/mm$^2$ or more.

Below, the detailed examples of the present invention will be further described in details by reference to drawings.

EXAMPLE 1

Figure 2:
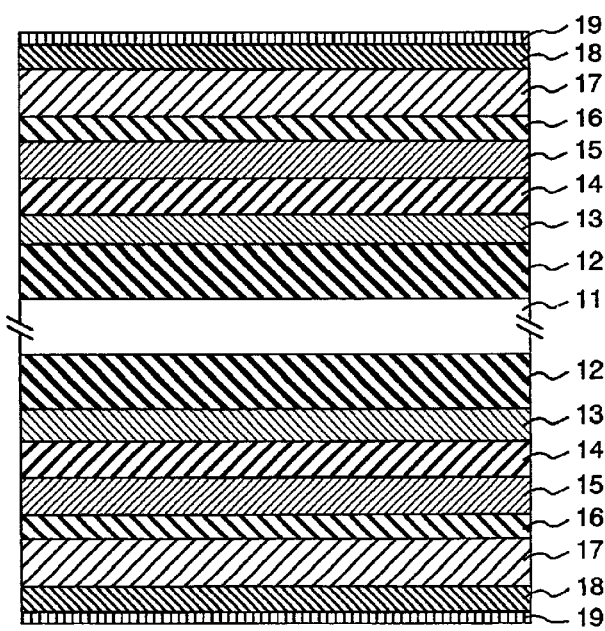
FIG. 2 is a schematic diagram showing one example of a cross sectional structure of a magnetic recording medium of the present invention.
Figure 3:
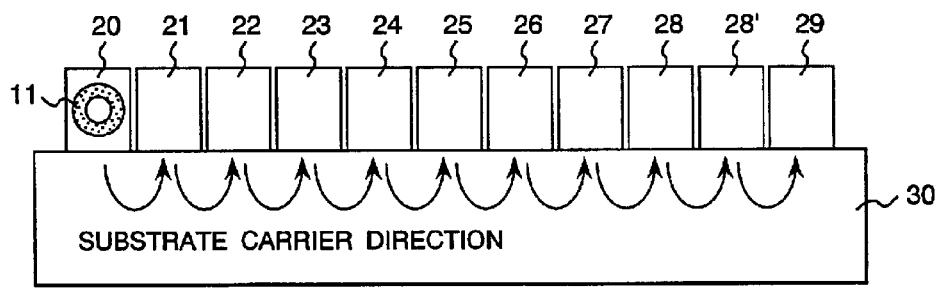
FIG. 3 is a schematic diagram showing the configuration of a disc formation apparatus used in the present invention.

FIG. 2 is a cross sectional view of the configuration of one embodiment of a magnetic recording medium of the present invention. As a substrate 11, a 0.635 mm-thick and 2.5-dia type aluminosilicate glass substrate of which surface had been chemically reinforced was used. This substrate was subjected to alkali cleaning. Subsequently, the following multi-layered film was formed with a tact of 9 sec by means of a sheet-fed type sputtering apparatus (NDP250B) manufactured by Intervac Co. The chamber configuration or the station configuration of this sputtering apparatus is shown in FIG. 3. First, in a charging chamber 20, the substrate 11 was kept under vacuum, and in a first underlayer forming chamber 21, first underlayers 12 each made of a 30 nm-thick Ni-37.5 at % Ta alloy were formed on both the sides of the substrate 11. Thereafter, in a heating chamber 22, heating was conducted in a mixed gas atmosphere of an Ar gas and oxygen by a lamp heater so that the temperature of the substrate is about 240° C. In a second underlayer forming chamber 23, second underlayers 13 each made of a 10 nm-thick Cr-20 at % Ti alloy were formed respectively thereon.

Further, subsequently, in a third underlayer forming chamber 24, third underlayers 14 each made of a 3 nm-thick Co-40 at % Ru alloy were formed respectively thereon. Then, in a lower magnetic layer forming chamber 25, lower magnetic layers 15 each made of a 2 to 10 nm-thick Co-24 at % Ru-8 at % B alloy were formed respectively thereon. In an intermediate layer forming chamber 26, 0.4 nm-thick Ru intermediate layers 16 were formed respectively thereon. Then, in an upper magnetic layer forming chamber 27, 18 nm to 21 nm-thick upper magnetic layers 17 each made of Co-18 at % Cr-14 at % Pt-8 at % B alloy were formed respectively thereon. In two protective layer forming chambers 28 and 28', protective layers 18 each having a total thickness of 4 nm were formed respectively thereon. Table 1 shows the combinations of the thickness of the lower magnetic layer and the thickness of the upper magnetic layer. Subsequently, the substrate was taken out from the sputtering apparatus. Then, a lubricant containing perfluoroalkyl-polyether as a main component was applied on the protective layers to form 1.8 nm-thick lubricant layers 19.

For forming the first underlayers 12, the second underlayers 13, the third underlayers 14, the lower magnetic layers 15, the intermediate layers 16, and the upper magnetic layers 17, Ar was used as a discharge gas in all the cases. The gas pressure was set at 5.3 Pa (40 mTorr) only for depositing the lower magnetic layers, and at 0.93 Pa (7 mTorr) for depositing other layers. Further, for forming the protective layers 18 made of carbon, Ar containing nitrogen was used as the discharge gas, and the pressure thereof was set at 1.33 Pa (10 mTorr).

The magnetic recording medium formed in this manner was cut, and the laminated thin film portion was reduced in thickness in a mortar form vertically along the direction perpendicular to the layer surface by an ion thinning method. Thus, the microfine structure of the first underlayer was observed by means of a transmission electron microscope with an acceleration voltage of 200 kV. As a result, the crystal grain size was found to be 5 nm or less. Further, upon photographing the selected-area electron diffraction image, a halo was observed. Accordingly, it has been confirmed that the structure is substantially an amorphous structure.

The magnetic characteristics of the magnetic disk medium obtained were evaluated by a coercivity measuring apparatus utilizing the Kerr effect and a vibrating sample magnetometer (VSM). From the magnetic disk, 8 mm square samples were cut to be used as test samples for VSM. The measurement of the magnetic characteristics by VSM was carried out at room temperature by applying a magnetic field of up to 800 kA/m at maximum in the circumferential direction of the medium. Table 2 shows the magnetic characteristics corresponding to their respective sample Nos. shown in Table 1. The coercivities Hc determined by using the Kerr effect were less than 300 kA/m for the sample Nos. 101, 102, and 106. For the samples having coercivities in excess of 300 kA/m, the magnetic characteristics were evaluated by VSM. The thermal stability factor ($ku \cdot v/kT$) was determined by approximating the time dependence of the remanence coercivity at 7.5 sec to 240 sec at room temperature to the Sharrock's equation. Incidentally, the measurements of the remanence coercivity were carried out for 6 points at 7.5, 15, 30, 60, 120 and 240 sec later.

TABLE 1

| Sample No. | Lower magnetic layer Co-24at % Ru-8at % B (nm) | Intermediate layer Ru (nm) | Upper magnetic layer Co-18at % Cr-14at % Pt-8at % B (nm) |
|---|---|---|---|
| 101 | 10.0 | 0.4 | 18.0 |
| 102 | 8.0 | ↑ | 18.0 |
| 103 | 6.0 | ↑ | 18.0 |
| 104 | 4.0 | ↑ | 18.0 |
| 105 | 2.0 | ↑ | 18.0 |
| 106 | 10.0 | ↑ | 19.5 |
| 107 | 8.0 | ↑ | 19.5 |
| 108 | 6.0 | ↑ | 19.5 |
| 109 | 4.0 | ↑ | 19.5 |
| 110 | 2.0 | ↑ | 19.5 |
| 111 | 10.0 | ↑ | 21.0 |
| 112 | 8.0 | ↑ | 21.0 |
| 113 | 6.0 | ↑ | 21.0 |
| 114 | 4.0 | ↑ | 21.0 |
| 115 | 2.0 | ↑ | 21.0 |

TABLE 2

| | Kerr | VSM | | | |
|---|---|---|---|---|---|
| Sample No. | Hc (kA/m) | Hc (kA/m) | S* | Br · t (T · nm) | Ku · v/kT |
| 101 | 241 | — | — | — | — |
| 102 | 264 | — | — | — | — |
| 103 | 328 | 249 | 0.83 | 2.7 | 79 |
| 104 | 328 | 276 | 0.70 | 3.9 | 84 |
| 105 | 334 | 295 | 0.71 | 4.8 | 83 |
| 106 | 260 | — | — | — | — |
| 107 | 320 | 237 | 0.68 | 2.1 | 81 |
| 108 | 331 | 249 | 0.59 | 3.2 | 84 |
| 109 | 333 | 289 | 0.73 | 4.3 | 87 |
| 110 | 339 | 306 | 0.74 | 5.5 | 90 |
| 111 | 319 | 187 | 0.50 | 1.9 | 78 |
| 112 | 333 | 240 | 0.72 | 2.4 | 84 |
| 113 | 334 | 270 | 0.72 | 3.5 | 85 |
| 114 | 334 | 290 | 0.70 | 5.2 | 93 |
| 115 | 339 | 304 | 0.72 | 5.9 | 93 |

Figure 4:
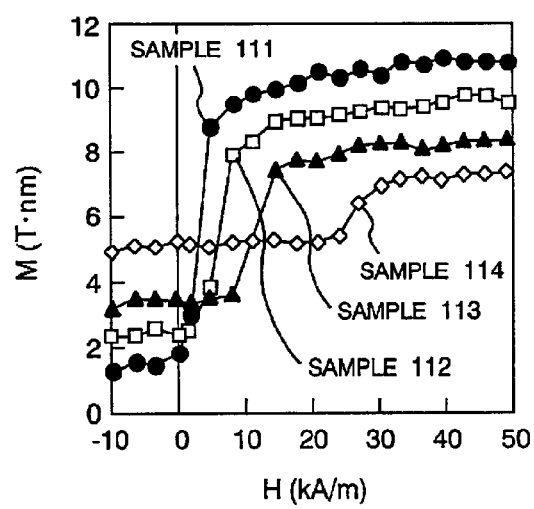
FIG. 4 is an enlarged view of a portion at a magnetic field of around zero of the hysteresis loop of a medium of one example of the present invention.

Not depending upon the thickness of the upper magnetic layer, if the thickness of the lower magnetic layer was increased, the coercivity, the product (Br·t) of the residual magnetic flux density Br and the thickness t of the magnetic layer, the thermal stability factor (Ku·v/kT), and the like were reduced. For example, in the medium in which the thickness of the upper magnetic layer had been set at 21 nm, when the thickness of the lower magnetic layer was increased up to 2 nm to 10 nm, the coercivity decreased to 304 kA/m to 187 kA/m, the Br·t decreased to 5.9 Tnm to 1.9 Tnm, and the Ku·v/kT decreased to 93 to 78. FIG. 4 shows the enlarged view of a portion at a magnetic field of around zero of each hysteresis loop of the sample Nos. 111 to 114. For any of the media, steps are observed in the hysteresis loop in the area in which the magnetic field is positive (upper right quadrant region).

This indicates as follows. When the magnetic field has been set at zero, the magnetization reversal of the lower magnetic layer is completed. Thus, in the residual magnetization state, the magnetization of the lower magnetic layer is oriented in antiparallel to the magnetization of the upper magnetic layer. In consequence, it has been shown that, in each of the media of this example, even if the thickness of the lower magnetic layer is increased to 10 nm, the magnetizations of the upper magnetic layer and the lower magnetic layer are oriented in antiparallel to each other in the residual magnetization state.

The evaluation of the electromagnetic transfer characteristics was carried out by using a composite head made up of a GMR head having a shield gap length of 0.10 μm and a track width for read (Twr) of 0.33 μm, and a writing head having a gap length of 0.14 μm. The linear recording density which was ⅙ the maximum linear recording density (HF) was set for 1F of the overwrite characteristic, wherein the maximum linear recording density (HF) was 24.8 kFC/mm (630 kFCI). The electromagnetic transfer characteristics corresponding to the sample Nos. shown in Table 1 are shown in Table 3. If the lower magnetic layer is increased in thickness not depending upon the thickness of the upper magnetic layer, the output half-width (PW50) of the solitary reproduction wave decreased, and the output resolution (ReMF) at the linear recording density (MF) which was half the maximum linear recording density was improved. Further, at this step, the overwrite characteristic (OW) was also improved.

TABLE 3

| Sample No. | So (μ Vpp) | PW50 (nm) | OW (dB) | ReMF (%) | Nd/So (μ Vrms/μ Vpp) | Media S/N (dB) |
|---|---|---|---|---|---|---|
| 103 | 954 | 116 | 42 | 53.3 | 0.0417 | 22.1 |
| 104 | 1250 | 120 | 37 | 49.0 | 0.0384 | 22.1 |
| 105 | 1486 | 123 | 36 | 48.8 | 0.0394 | 21.9 |
| 108 | 1055 | 117 | 41 | 51.2 | 0.0391 | 22.3 |
| 109 | 1375 | 123 | 36 | 47.6 | 0.0384 | 21.9 |
| 110 | 1592 | 125 | 36 | 47.9 | 0.0391 | 21.8 |
| 113 | 1163 | 118 | 40 | 50.9 | 0.0384 | 22.4 |
| 114 | 1440 | 124 | 36 | 47.3 | 0.0398 | 21.5 |
| 115 | 1640 | 127 | 35 | 47.9 | 0.0412 | 21.3 |

On the other hand, the normalized media noise (Nd/So) obtained by normalizing the media noise (Nd) when recording was performed at HF with a solitary reproduction wave output (So) exhibited different lower magnetic layer thickness dependencies according to the thickness of the upper magnetic layer. In the case where the lower magnetic layer thickness was increased to 2 nm to 6 nm when the thickness of the upper magnetic layer was 18.0 mm, the Nd/So increased about 6%. In contrast, it decreased about 7% when the thickness of the upper magnetic layer was 21.0 nm. Further, the media S/N showed the highest value when the upper magnetic layer thickness was set at 21 nm, and the lower magnetic layer thickness was increased to 6 nm. Herein, the media S/N is the value defined as media S/N=20 log (SMF/Nd) by using the read output at MF (SMF) and Nd.

When a Co-32 at % Cr-6 at % Zr, Co-36 at % Cr-8 at % Ta, Co-40 at % V-8 at % B, or Co-50 at % V-12 at % Si alloy was used in place of the Ni-37.5 at % Ta alloy for the first underlayer, in combination with the magnetic layer of the sample No. 113, a particularly low normalized noise was shown. Further, for the medium using a Ni-40 at % Cr-8 at % Zr, or Ni-55 at % V-15 at % Si alloy for the first underlayer, a particularly high coercivity of 360 kA/m or more was obtained.

EXAMPLE 2

Media each having the same layer configuration as that in Example 1, except that a Co-24 at % Ru-10 at % B alloy was used as the lower magnetic layer were formed through the same deposition process as that in Example 1. Table 4 shows the combinations of the thickness of the lower magnetic layer and the thickness of the upper magnetic layer, and Table 5 shows the magnetic characteristics thereof. From the comparison between the magnetic characteristics shown in Tables 2 and 5, it has been shown that, when the same thickness is adopted for each upper magnetic layer, use of the Co-24 at % Ru-10 at % B alloy provides larger Hc, Br·t, and Ku·v/kT than with the use of Co-24 at % Ru-8 at % B alloy for the lower magnetic layer.

The electromagnetic transfer characteristics of disks having their respective magnetic characteristics of Table 5 were evaluated by using the magnetic head used for the disk evaluation in Example 1. As a result, as shown in Table 6, it has been shown as follows. Namely, when the Co-24 at % Ru-10 at % B has been used for the lower magnetic layer, if the thickness of the lower magnetic layer is increased to 2 nm to 6 nm, not depending upon the thickness of the upper magnetic layer, (1) PW50 shortens; (2) the overwrite characteristic and the media S/N are improved; and (3) the Nd/So decreases. Especially when the thickness of the upper magnetic layer has been set at 21 nm, the decrease in Nd/So is noticeable.

TABLE 4

| Sample No. | Lower magnetic layer Co-24at % Ru-10at % B (nm) | Intermediate layer Ru (nm) | Upper magnetic layer Co-18at % Cr-14at % Pt-8at % B (nm) |
|---|---|---|---|
| 201 | 10.0 | 0.4 | 18.0 |
| 202 | 8.0 | ↑ | 18.0 |
| 203 | 6.0 | ↑ | 18.0 |
| 204 | 4.0 | ↑ | 18.0 |
| 205 | 2.0 | ↑ | 18.0 |
| 206 | 10.0 | ↑ | 19.5 |
| 207 | 8.0 | ↑ | 19.5 |
| 208 | 6.0 | ↑ | 19.5 |
| 209 | 4.0 | ↑ | 19.5 |
| 210 | 2.0 | ↑ | 19.5 |
| 211 | 10.0 | ↑ | 21.0 |
| 212 | 8.0 | ↑ | 21.0 |
| 213 | 6.0 | ↑ | 21.0 |
| 214 | 4.0 | ↑ | 21.0 |
| 215 | 2.0 | ↑ | 21.0 |

TABLE 5

| | Kerr | VSM | | | |
|---|---|---|---|---|---|
| Sample No. | Hc (kA/m) | Hc (kA/m) | S* | Br · t (T · nm) | Ku · v/kT |
| 201 | 227 | — | — | — | — |
| 202 | 260 | — | — | — | — |
| 203 | 318 | 252 | 0.77 | 3.2 | 81 |
| 204 | 324 | 268 | 0.77 | 4.3 | 84 |
| 205 | 336 | 308 | 0.75 | 5.2 | 90 |
| 206 | 311 | — | — | — | — |
| 207 | 316 | 237 | 0.69 | 2.8 | 81 |
| 208 | 321 | 253 | 0.75 | 3.8 | 84 |
| 209 | 329 | 283 | 0.73 | 5.0 | 89 |
| 210 | 341 | 309 | 0.74 | 6.1 | 93 |
| 211 | 313 | 206 | 0.54 | 2.3 | 82 |
| 212 | 321 | 254 | 0.70 | 3.4 | 86 |
| 213 | 324 | 277 | 0.73 | 4.4 | 93 |
| 214 | 328 | 287 | 0.73 | 5.7 | 94 |
| 215 | 342 | 319 | 0.73 | 6.8 | 99 |

TABLE 6

| Sample No. | So (μ Vpp) | PW50 (nm) | OW (dB) | ReMF (%) | Nd/So (μ Vrms/μ Vpp) | Media S/N (dB) |
|---|---|---|---|---|---|---|
| 203 | 1072 | 119 | 41 | 50.7 | 0.0369 | 22.8 |
| 204 | 1346 | 123 | 37 | 47.8 | 0.0396 | 21.6 |

TABLE 6-continued

| Sample No. | So (μ Vpp) | PW50 (nm) | OW (dB) | ReMF (%) | Nd/So (μ Vrms/μ Vpp) | Media S/N (dB) |
|---|---|---|---|---|---|---|
| 205 | 1559 | 125 | 36 | 47.9 | 0.0393 | 21.7 |
| 208 | 1231 | 120 | 39 | 48.7 | 0.0351 | 22.8 |
| 209 | 1507 | 125 | 35 | 47.1 | 0.0390 | 21.6 |
| 210 | 1681 | 126 | 36 | 47.6 | 0.0398 | 21.6 |
| 213 | 1370 | 123 | 38 | 48.0 | 0.0347 | 22.8 |
| 214 | 1608 | 128 | 35 | 46.4 | 0.0402 | 21.2 |
| 215 | 1781 | 129 | 34 | 46.8 | 0.0413 | 21.1 |

EXAMPLE 3

Media each having the same layer configuration as that in Example 1 were formed, except for changing (1) the substrate temperature, (2) the thickness of the CrTi underlayer, and (3) the thickness of the Ru intermediate layer. The deposition process was the same as that in Example 1, except that the Ar gas pressure during deposition of the lower magnetic layer was set at 0.93 Pa. Tables 7 to 9 show the relationship between the layer configuration of each medium and the sample number, the magnetic characteristics, and the electromagnetic transfer characteristics. Incidentally, a head having a Twr=0.35 μm was used for the evaluation of the electromagnetic transfer characteristics. Any of the media showed a high coercivity of 260 kA/m or more, and a low normalized media noise of 0.04 μVrms/μVpp or less.

TABLE 9

| Sample No. | So (μ Vpp) | PW50 (nm) | OW (dB) | ReMF (%) | Nd/So (μ Vrms/μ Vpp) | Media S/N (dB) |
|---|---|---|---|---|---|---|
| 301 | 1107 | 125.7 | 37 | 48 | 0.0400 | 21.6 |
| 302 | 1132 | 125.2 | 36 | 48 | 0.0372 | 22.3 |
| 303 | 1097 | 125.2 | 36 | 49 | 0.0391 | 22.0 |
| 304 | 1153 | 126.6 | 36 | 48 | 0.0356 | 22.6 |
| 305 | 1154 | 128.1 | 35 | 48 | 0.0379 | 22.0 |
| 306 | 1116 | 126.8 | 35 | 48 | 0.0385 | 21.9 |
| 307 | 1127 | 125.4 | 35 | 48 | 0.0384 | 22.0 |
| 309 | 1059 | 125.3 | 35 | 49 | 0.0378 | 22.2 |

The Ha and the Ku·v/kT tended to increase with an increase in substrate temperature, but that the media S/N became maximum when the substrate temperature was 240° C. The Ha and the Ku·v/kT increased also when the CrTi underlayer was increased in thickness. The Nd/So of the medium (sample No. 304) in which the thickness of the CrTi underlayer had been decreased to 5 nm was minimum, indicating that a decrease in thickness of the CrTi underlayer is effective for noise reduction. On the other hand, the change in electromagnetic transfer characteristics with the change in thickness of the Ru intermediate layer was small, and the characteristics were generally constant within a range of 0.2 to 0.8 nm. Whereas, for evaluating the magnetic characteristics of the Co-24 at % Ru-8 at % B alloy used for the lower magnetic layer, a medium in which the thickness of the magnetic layer had been set at 18 nm and the upper magnetic layer had not been formed was manufactured. The

TABLE 7

| Sample No. | Substrate temperature (° C.) | Second underlayer Cr-20at % Ti (nm) | Lower magnetic layer Co-24at % Ru-8at % B (nm) | Intermediate layer Ru (nm) | Upper magnetic layer Co-18at % Cr-14at % Pt-8at % B (nm) |
|---|---|---|---|---|---|
| 301 | 210 | 10 | 2.0 | 0.4 | 18.0 |
| 302 | 240 | 10 | ↑ | ↑ | ↑ |
| 303 | 270 | 15 | ↑ | ↑ | ↑ |
| 304 | ↑ | 5 | ↑ | ↑ | ↑ |
| 305 | ↑ | 10 | ↑ | 0.8 | ↑ |
| 306 | ↑ | ↑ | ↑ | 0.6 | ↑ |
| 307 | ↑ | ↑ | ↑ | 0.4 | ↑ |
| 308 | ↑ | ↑ | ↑ | 0.2 | ↑ |
| 309 | 300 | ↑ | ↑ | ↑ | ↑ |

TABLE 8

| Sample No. | Hc (kA/m) | S* | Br·t (T·nm) | Ku·v/kT |
|---|---|---|---|---|
| 301 | 264 | 0.80 | 5.0 | 78 |
| 302 | 298 | 0.72 | 5.1 | 88 |
| 303 | 338 | 0.72 | 5.2 | 105 |
| 304 | 295 | 0.66 | 5.4 | 89 |
| 305 | 317 | 0.63 | 5.4 | 101 |
| 306 | 326 | 0.70 | 5.4 | 100 |
| 307 | 331 | 0.68 | 5.2 | 103 |
| 309 | 345 | 0.69 | 4.8 | 118 | magnetization curve was measured by applying a magnetic field in the in-plane direction. As a result, the coercivity and the saturation magnetic flux density were 8.8 kA/m and 0.60 T, respectively.

EXAMPLE 4

Media each having the same layer configuration as that in Example 2 were formed, except for changing (1) the substrate temperature, (2) the thickness of the CrTi underlayer, and (3) the thickness of the Ru intermediate layer. Tables 10 to 12 show the relationship between the layer configuration of each medium and the sample number, and the magnetic characteristics, and the electromagnetic transfer characteristics evaluated by the head used in Example 3, respectively. Any of the media showed a high Hc of 250 kA/m or more, and a high media S/N of 21.5 dB or more. As with Example 3, both of the Hc and the Ku·v/kT increased with an increase in substrate temperature and an increase in thickness of the CrTi underlayer. However, both values of the Hc and the Ku·v/kT were slightly smaller as compared with the media of Example 3. Further, the medium (sample No. 404) in which the thickness of the CrTi underlayer had been decreased to 5 nm had the lowest noise, and had the maximum media S/N.

As for the media of this example, there were not observed large differences in electromagnetic transfer characteristics as compared with the media of Example 3. The coercivity and the saturation magnetic flux density of the Co-24 at % Ru-10 at % B alloy used for the lower magnetic layer were determined in the same manner as in Example 3, and found to be 7.6 kA/m and 0.56 T, respectively.

TABLE 10

| Sample No. | Substrate temperature (° C.) | Second underlayer Cr-20at % Ti (nm) | Lower magnetic layer Co-24at % Ru-10at % B (nm) | Intermediate layer Ru (nm) | Upper magnetic layer Co-18at % Cr-14at % Pt-8at % B (nm) |
|---|---|---|---|---|---|
| 401 | 210 | 10 | 2.0 | 0.4 | 18.0 |
| 402 | 240 | 10 | ↑ | ↑ | ↑ |
| 403 | 270 | 15 | ↑ | ↑ | ↑ |
| 404 | ↑ | 5 | ↑ | ↑ | ↑ |
| 405 | ↑ | 10 | ↑ | 0.8 | ↑ |
| 406 | ↑ | ↑ | ↑ | 0.6 | ↑ |
| 407 | ↑ | ↑ | ↑ | 0.4 | ↑ |
| 408 | ↑ | ↑ | ↑ | 0.2 | ↑ |
| 409 | 300 | ↑ | ↑ | ↑ | ↑ |

TABLE 11

| Sample No. | Hc (kA/m) | S* | Br · t (T · nm) | Ku · v/kT |
|---|---|---|---|---|
| 401 | 254 | 0.80 | 5.5 | 71 |
| 402 | 286 | 0.68 | 5.4 | 84 |
| 403 | 322 | 0.71 | 5.3 | 103 |
| 404 | 281 | 0.69 | 5.3 | 85 |
| 405 | 318 | 0.69 | 5.4 | 100 |
| 406 | 312 | 0.64 | 5.4 | 99 |
| 407 | 314 | 0.60 | 5.6 | 99 |
| 409 | 336 | 0.68 | 5.5 | 115 |

TABLE 12

| Sample No. | So (μ Vpp) | PW50 (nm) | OW (dB) | ReMF (%) | Nd/So (μ Vrms/μ Vpp) | Media S/N (dB) |
|---|---|---|---|---|---|---|
| 401 | 1197 | 128 | 36 | 48 | 0.0399 | 21.5 |
| 402 | 1179 | 128 | 35 | 48 | 0.0364 | 22.3 |
| 403 | 1117 | 128 | 35 | 49 | 0.0387 | 22.0 |
| 404 | 1181 | 127 | 36 | 47 | 0.0349 | 22.5 |
| 405 | 1164 | 129 | 35 | 48 | 0.0372 | 22.1 |
| 406 | 1130 | 128 | 35 | 48 | 0.0376 | 22.2 |
| 407 | 1151 | 127 | 35 | 48 | 0.0371 | 22.2 |
| 409 | 1122 | 128 | 35 | 48 | 0.0379 | 22.0 |

EXAMPLE 5

The media in each of which a 25 nm-thick Co-30 at % Cr-10 at % Zr alloy layer was used as the first underlayer, and a Co-20 at % Cr-14 at % Pt-6 at % B alloy layer was used as the upper magnetic layer were manufactured. The layer configuration and the deposition process are the same as in Example 1. Table 13 shows the set values of (1) the substrate temperature, (2) the thickness of the second underlayer, (3) the thickness of the lower magnetic layer, (4) the thickness of the Ru intermediate layer, and (5) the thickness of the upper magnetic layer. Table 14 shows the respective magnetic characteristics corresponding to the media. The Ku·v/kT increases up to 330° C. with an increase in substrate temperature, but the coercivity tends to be saturated at 300° C. or more. Further, the coercivity squareness S* of each medium of this example was smaller as compared with the S* of each medium of examples shown in Examples 1 to 4. Table 15 shows the electromagnetic transfer characteristics of respective media evaluated by the head in which Twr=0.33 μm. As for each of the media other than the medium of the sample No. 508 in which the thickness of the lower magnetic layer was 6 nm, the Nd/So was as low as 0.04 μVrms/μVpp or less, and the media S/N was as large as 22.0 dB or more. From the fact that the highest S/N is obtainable when the thickness of the lower magnetic layer is 1 nm, it has been shown that the optimum value of the thickness of the lower magnetic layer also depends upon the composition of the upper magnetic layer.

TABLE 13

| Sample No. | Substrate temperature (° C.) | Second underlayer Cr-20at % Ti (nm) | Lower magnetic layer Co-24at % Ru-8at % B (nm) | Intermediate layer Ru (nm) | Upper magnetic layer Co-20at % Cr-14at % Pt-6at % B (nm) |
|---|---|---|---|---|---|
| 501 | 270 | 20 | 2.0 | 0.4 | 18.0 |
| 502 | 300 | ↑ | ↑ | ↑ | ↑ |
| 503 | 330 | 25 | ↑ | ↑ | ↑ |
| 504 | ↑ | 15 | ↑ | ↑ | ↑ |
| 505 | ↑ | ↑ | ↑ | 0.6 | ↑ |
| 506 | ↑ | ↑ | ↑ | 0.4 | ↑ |
| 507 | ↑ | ↑ | ↑ | 0.2 | ↑ |

TABLE 13-continued

| Sample No. | Substrate temperature (° C.) | Second underlayer Cr-20at % Ti (nm) | Lower magnetic layer Co-24at % Ru-8at % B (nm) | Intermediate layer Ru (nm) | Upper magnetic layer Co-20at % Cr-14at % Pt-6at % B (nm) |
|---|---|---|---|---|---|
| 508 | ↑ | ↑ | 6.0 | ↑ | ↑ |
| 509 | ↑ | ↑ | 4.0 | ↑ | ↑ |
| 510 | ↑ | ↑ | 1.0 | ↑ | ↑ |
| 511 | ↑ | ↑ | 2.0 | ↑ | 16.5 |
| 512 | ↑ | ↑ | ↑ | ↑ | 19.5 |

TABLE 14

| Sample No. | Hc (kA/m) | S* | Br · t (T · nm) | Ku · v/kT |
|---|---|---|---|---|
| 501 | 284 | 0.61 | 5.2 | 96 |
| 502 | 306 | 0.59 | 5.1 | 110 |
| 503 | 329 | 0.61 | 5.0 | 128 |
| 504 | 279 | 0.45 | 4.8 | 98 |
| 505 | 302 | 0.48 | 4.9 | 119 |
| 506 | 305 | 0.54 | 4.8 | 120 |
| 507 | 303 | 0.45 | 4.8 | 122 |
| 508 | 202 | 0.23 | 2.7 | 95 |
| 509 | 251 | 0.46 | 3.6 | 108 |
| 510 | 313 | 0.46 | 5.2 | 115 |
| 511 | 295 | 0.41 | 4.6 | 116 |
| 512 | 305 | 0.48 | 5.4 | 122 |

TABLE 15

| Sample No. | So (μ Vpp) | PW50 (nm) | OW (dB) | ReMF (%) | Nd/So (μ Vrms/μ Vpp) | Media S/N (dB) |
|---|---|---|---|---|---|---|
| 501 | 1184 | 128 | 37 | 48 | 0.0377 | 22.1 |
| 502 | 1140 | 127 | 37 | 48 | 0.0367 | 22.3 |
| 503 | 1105 | 128 | 38 | 48 | 0.0381 | 22.0 |
| 504 | 1071 | 128 | 39 | 47 | 0.0358 | 22.4 |
| 505 | 1113 | 128 | 38 | 48 | 0.0369 | 22.3 |
| 506 | 1103 | 127 | 38 | 48 | 0.0366 | 22.3 |
| 507 | 1108 | 129 | 38 | 47 | 0.0371 | 22.1 |
| 508 | 646 | 111 | 39 | 56 | 0.0595 | 19.5 |
| 509 | 844 | 121 | 42 | 48 | 0.0360 | 22.5 |
| 510 | 1170 | 128 | 38 | 47 | 0.0368 | 22.2 |
| 511 | 1043 | 125 | 39 | 49 | 0.0365 | 22.5 |
| 512 | 1188 | 131 | 37 | 47 | 0.0374 | 22.0 |

EXAMPLE 6

The media each having the same layer configuration in Example 5 were manufactured, except that a Co-18 at % Cr-14 at % Pt-6 at % B-2 at % Cu alloy was used for the upper magnetic layer. Table 16 shows the set values of (1) the substrate temperature, (2) the thickness of the second underlayer, (3) the thickness of the lower magnetic layer, (4) the thickness of the Ru intermediate layer, and (5) the thickness of the upper layer. The Co—Cr—Pt—B—Cu alloy used for the upper magnetic layer in this example has a saturation magnetic flux density which is about 20% higher than that of the Co—Cr—Pt—B alloy used in Example 5. Therefore, the standard thickness of the upper magnetic layer was set at 15.0 nm. The magnetic characteristics of the respective media shown in Table 16 are shown in Table 17. It was possible to obtain media each having a high coercivity of 240 kA/m or more except for the sample No. 608. Further, from the comparison between the medium of a sample No. 612 and the medium of a sample No. 511 of Example 5, it has been shown that, when an equal thickness is adopted, use of the Co—Cr—Pt—B—Cu alloy of this example for the upper magnetic layer provides a higher coercivity and a higher Ku·v/kT than with the use of the Co—Cr—Pt—B alloy of Example 5.

TABLE 16

| Sample No. | Substrate temperature (° C.) | Second underlayer Cr-20at % Ti (nm) | Lower magnetic layer Co-24at % Ru-8at % B (nm) | Intermediate layer Ru (nm) | Upper magnetic layer Co-18at % Cr-14at % Pt-6at % B-2at % Cu (nm) |
|---|---|---|---|---|---|
| 601 | 270 | 20 | 2.0 | 0.4 | 15.0 |
| 602 | 300 | ↑ | ↑ | ↑ | ↑ |
| 603 | 330 | 25 | ↑ | ↑ | ↑ |
| 604 | ↑ | 15 | ↑ | ↑ | ↑ |
| 605 | ↑ | ↑ | ↑ | 0.6 | ↑ |
| 606 | ↑ | ↑ | ↑ | 0.4 | ↑ |
| 607 | ↑ | ↑ | ↑ | 0.2 | ↑ |
| 608 | ↑ | ↑ | 6.0 | ↑ | ↑ |
| 609 | ↑ | ↑ | 4.0 | ↑ | ↑ |

TABLE 16-continued

| Sample No. | Substrate temperature (° C.) | Second underlayer Cr-20at % Ti (nm) | Lower magnetic layer Co-24at % Ru-8at % B (nm) | Intermediate layer Ru (nm) | Upper magnetic layer Co-18at % Cr-14at % Pt-6at % B-2at % Cu (nm) |
|---|---|---|---|---|---|
| 610 | ↑ | ↑ | 1.0 | ↑ | ↑ |
| 611 | ↑ | ↑ | 2.0 | ↑ | 13.5 |
| 612 | ↑ | ↑ | ↑ | ↑ | 16.5 |

TABLE 17

| Sample No. | Hc (kA/m) | S* | Br · t (T · nm) | Ku · v/kT |
|---|---|---|---|---|
| 601 | 270 | 0.63 | 4.8 | 97 |
| 602 | 287 | 0.54 | 4.5 | 104 |
| 603 | 322 | 0.42 | 4.6 | 121 |
| 604 | 247 | 0.49 | 4.4 | 97 |
| 605 | 287 | 0.41 | 4.7 | 114 |
| 606 | 291 | 0.39 | 4.6 | 113 |
| 607 | 293 | 0.38 | 4.8 | 115 |
| 608 | 183 | 0.14 | 2.1 | 95 |
| 609 | 246 | 0.39 | 3.4 | 108 |
| 610 | 303 | 0.43 | 5.0 | 116 |
| 611 | 277 | 0.38 | 4.2 | 105 |
| 612 | 308 | 0.48 | 4.9 | 125 |

Table 18 shows the electromagnetic transfer characteristics of each disk. The head used for the evaluation has a write gap length 0.14 μm, a shield gap length of 0.10 μm, and a Twr=0.33 μm. The head flying height hm (the distance between the surface of the upper magnetic layer and the surface of the main pole) was set at 24 nm, and the circumferential speed was set at 7 m/s. The medium (sample No. 604) in which the thickness of the second underlayer had been decreased to 10 nm, and the medium (sample No. 609) in which the thickness of the lower magnetic layer had been decreased to 4.0 nm showed the lowest Nd/So, and a high media S/N of 22.6 dB or more. Table 19 shows the results when the measurements have been carried out by using another head in which the write gap length and the shield gap length have been the same as before, and the hm has been set at 23 nm. Also in this case, relatively lower Nd/So values were obtained for the media of the sample Nos. 604 and 609.

TABLE 18

| Sample No. | So (μ Vpp) | PW50 (nm) | OW (dB) | ReMF (%) | Nd/So (μ Vrms/μ Vpp) | Media S/N (dB) |
|---|---|---|---|---|---|---|
| 601 | 1711 | 129 | 39 | 50 | 0.0395 | 22.1 |
| 602 | 1660 | 129 | 39 | 49 | 0.0379 | 22.3 |
| 603 | 1611 | 129 | 38 | 50 | 0.0382 | 22.2 |
| 604 | 1576 | 130 | 40 | 48 | 0.0353 | 22.6 |
| 605 | 1609 | 130 | 39 | 48 | 0.0368 | 22.3 |
| 606 | 1581 | 130 | 40 | 49 | 0.0369 | 22.4 |
| 607 | 1621 | 130 | 40 | 48 | 0.0367 | 22.3 |
| 608 | 807 | 114 | 41 | 56 | 0.0699 | 18.1 |
| 609 | 1180 | 124 | 41 | 49 | 0.0352 | 22.8 |
| 610 | 1664 | 129 | 40 | 49 | 0.0373 | 22.4 |
| 611 | 1415 | 127 | 41 | 50 | 0.0371 | 22.5 |
| 612 | 1677 | 132 | 38 | 47 | 0.0374 | 22.0 |

TABLE 19

| Sample No. | So (μ Vpp) | PW50 (nm) | OW (dB) | ReMF (%) | Nd/So (μ Vrms/μ Vpp) | Media S/N (dB) |
|---|---|---|---|---|---|---|
| 604 | 1113 | 127 | 39 | 50 | 0.0379 | 22.4 |
| 606 | 1142 | 126 | 39 | 51 | 0.0388 | 22.4 |
| 608 | 610 | 99 | 40 | 58 | 0.0734 | 18.0 |
| 609 | 850 | 120 | 42 | 51 | 0.0374 | 22.7 |
| 610 | 1212 | 126 | 39 | 50 | 0.0388 | 22.3 |
| 611 | 1046 | 124 | 40 | 51 | 0.0385 | 22.4 |
| 612 | 1236 | 129 | 38 | 50 | 0.0395 | 22.0 |

EXAMPLE 7

The media each having the same layer configuration in Example 1 were manufactured, except that a Ni-20 at % Cr-10 at % Zr alloy was used for the first underlayer, and a Cr-40 at % MoB alloy was used for the second underlayer, and a 2 to 6 nm-thick Co-16 at % Ru, Co-16 at % Ru-3 at % B, Co-16 at % Ru-10 at % B, Co-16 at % Ru-20 at % B, Co-16 at % Ru-23 at % B, Co-30 at % Ru-8 at % B, Co-3 at % Ru-8 at % B, Co-10 at % Ru-5 at % Cr, Co-3 at % Ru-18 at % Cr-6 at % B, Co-14 at % Ru-5 at % C, or Co-14 at % Ru-5 at % Cr-5 at % C alloy was used for the lower magnetic layer. A 19 nm-thick Co-16 at % Cr-12 at % Pt-12 at % B alloy was used for the upper magnetic layer. Whereas, as a comparative example, a medium in which a Ru-free Co-18 at % Cr-9 at % Pt-6 at % B alloy was used for the lower magnetic layer was manufactured. Each magnetization curve was measured, and, for any of the media, steps have been observed in the area in which the magnetic field is positive in the magnetization curve. This has indicated that the magnetizations of the upper magnetic layer and the lower magnetic layer are oriented in anti parallel to each other in the residual magnetization state. Table 20 shows the electromagnetic characteristics evaluated by using the magnetic head described in Example 1.

TABLE 20

| Sample No. | Lower magnetic layer | So (μ Vpp) | OW (dB) | Nd/So (μ Vrms/μ Vpp) | Media S/N (dB) |
|---|---|---|---|---|---|
| 701 | Co-16at % Ru | 1260 | 37 | 0.0371 | 22.2 |
| 702 | Co-16at % Ru-3at % B | 1248 | 38 | 0.0367 | 22.1 |
| 703 | Co-16at % Ru-10at % B | 1140 | 38 | 0.0339 | 22.7 |
| 704 | Co-16at % Ru-20at % B | 1236 | 39 | 0.0354 | 22.3 |
| 705 | Co-16at % Ru-23at % B | 1020 | 33 | 0.0595 | 19.0 |
| 706 | Co-30at % Ru-8at % B | 1284 | 35 | 0.0376 | 22.7 |
| 707 | Co-3at % Ru-8at % B | 1164 | 38 | 0.0384 | 22.5 |
| 708 | Co-10at % Ru-5at % Cr | 1200 | 40 | 0.0389 | 22.4 |
| 709 | Co-3at % Ru-18at % Cr-6at % B | 1188 | 41 | 0.0391 | 21.6 |

TABLE 20-continued

| Sample No. | Lower magnetic layer | So (μ Vpp) | OW (dB) | Nd/So (μ Vrms/ μ Vpp) | Media S/N (dB) |
|---|---|---|---|---|---|
| 710 | Co-14at % Ru-5at % C | 1248 | 37 | 0.0397 | 22.5 |
| 711 | Co-14at % Ru-5at % Cr-5at % C | 1260 | 39 | 0.0405 | 22.5 |
| Comparative example | Co-18at % Cr-9at % Pt-6at % B | 1212 | 33 | 0.0448 | 20.2 |

For the media of the sample Nos. 701 and 702 shown in Table 20, the crystal grain sizes of each upper magnetic layer were observed by means of a transmission electron microscope with an acceleration voltage of 200 kV. Then, the mean grain size was estimated in the following manner. First, the area of each crystal grain was calculated by using the obtained lattice image magnified two million times, and the diameter of the perfect circle having the same area as this calculated area was defined as the grain size of the crystal grain. At this step, the area in which the lattice stripes had the same orientation was regarded as one crystal grain, while the crystal grains having such a structure (bi-crystal structure) that they were adjacent to each other with their c-axes intersecting at right angles were regarded as different crystal grains. The grain sizes were calculated from about 150 crystal grains, and the arithmetic mean thereof was taken to be regarded as the mean grain size.

The mean grain size of the upper magnetic layer was 10.3 nm for the medium of the sample No. 701. In contrast, it was 9.6 nm, i.e., about 7% microfiner, for the medium of the sample No. 702. On the other hand, for the medium of the sample No. 705 containing B in an amount of 23 at %, it was shown from the results of the X-ray diffraction measurement that the (11.0) orientation of the magnetic layer was largely deteriorated. It has been shown from the foregoing description as follows. Namely, in order to largely reducing the media noise by making fine the magnetic grain size, the B content of the lower magnetic layer is more desirably set at not less than 3 at % to not more than 20 at %.

Whereas, for both the medium (sample No. 706) having a Ru content of 30 at % and the medium (sample No. 707) having a Ru content of 3 at %, the noise was low. This has indicated that it is possible to obtain a low noise medium if the Ru content of the lower magnetic layer falls within a range of 3 at % to 30 at %.

As for the media (sample Nos. 708 and 709) in each of which the lower magnetic layer contained Cr, the overwrite characteristic was particularly good. Whereas, for the media (sample Nos. 710 and 711) in each of which C in place of B was added to the lower magnetic layer, the media noise was slightly higher, but the output resolution was high, and a high S/N was shown. On the other hand, for the medium in which a Co-20 at % Cr-12 at % Pt-6 at % B alloy was used for the lower magnetic layer of the comparative example, the overwrite characteristic was bad, and the media noise was also high.

EXAMPLE 8

A 35 nm-thick Ni-30 at % Nb alloy layer was formed as each first underlayer, and a 10 nm-thick Cr-15 at % Ti alloy layer was formed as each second underlayer. Then, as each third underlayer, a 3 nm-thick Co-34 at % Cr alloy layer was formed. Subsequently, as each lower magnetic layer, the layer of Co-4 at % Re, Co-8 at % Re-11 at % B, Co-6 at % Re-5 at % Cr, Co-5 at % Re-5 at % Cr-6 at % B, Co-12 at % Re-8 at % C, or Co-4 at % Re-4 at % B-4 at % C alloy layer was formed with a thickness of 2 to 6 nm. Thereafter, a 18 nm-thick Co-20 at % Cr-11 at % Pt-7 at % B alloy layer was formed via a 0.4 nm-thick Ru intermediate layer.

Each magnetization curve was measured by applying a magnetic field in the in-plane direction, and steps have been observed in the area in which the magnetic field is positive. This has indicated that the magnetizations of the upper magnetic layer and the lower magnetic layer are oriented in antiparallel to each other in the residual magnetization state. Table 21 shows the electromagnetic transfer characteristics evaluated by using the same magnetic head as that described in Example 1. Any of the media exhibited a high media S/N of 21 dB or more.

TABLE 21

| Sample No. | Lower magnetic layer | So (μ Vpp) | OW (dB) | Nd/So (μ Vrms/ μ Vpp) | Media S/N (dB) |
|---|---|---|---|---|---|
| 801 | Co-4at % Re | 1358 | 34 | 0.0385 | 21.2 |
| 802 | Co-8at % Re-11at % B | 1302 | 35 | 0.0347 | 21.9 |
| 803 | Co-6at % Re-5at % Cr | 1456 | 37 | 0.0377 | 21.3 |
| 804 | Co-5at % Re-5at % Cr-6at % B | 1470 | 38 | 0.0402 | 21.0 |
| 805 | Co-12at % Re-8at % C | 1414 | 33 | 0.0413 | 21.1 |
| 806 | Co-6at % Re-6at % Cr-8at % C | 1442 | 33 | 0.0399 | 21.2 |
| 807 | Co-4at % Re-4at % B-4at % C | 1456 | 33 | 0.0403 | 21.3 |

EXAMPLE 9

As each first underlayer, a 100 nm-thick Ni-50 at % Al alloy layer was formed, and as each second underlayer, a 25 nm-thick Cr-50 at % V alloy layer was formed. Then, the third underlayer was not provided, and each magnetic layer and each protective layer were successively deposited directly thereon. The first underlayer was formed on a 50 nm-by-50 nm basis in two separate chambers in such a manner as to be formed with a thickness of 50 nm each in respective ones of the two chambers. The substrate heating was carried out prior to formation of the underlayer so that the substrate temperature was 280° C. The deposition conditions for respective layers were the same as in Example 1, and the layer configuration of the magnetic layer and the Ru intermediate layer was the same as that of the medium of the sample No. 114. The X-ray diffraction measurement was carried out, and only the diffraction peak from the (10.0) plane was observed from the magnetic layer. This has indicated that it is the (10.0)-oriented medium. Further, in the magnetization curve, steps have been observed in the area in which the magnetic field is positive. This has indicated that the magnetizations of the upper magnetic layer and the lower magnetic layer are oriented in antiparallel to each other in the residual magnetization state. The coercivity, the S*, and the Br·t were 303 kA/m, 0.70, and 4.8 T·nm, respectively, and the Ku–v/kT was 105.

The electromagnetic transfer characteristics were evaluated by using the same magnetic head as in Example 1. As a result, the normalized media noise was 0.0365 μVrms/μVpp, and the media S/N was 22.0 dB. Thus, such good results were obtained.

EXAMPLE 10

A NiP-plated Al—Mg alloy substrate was heated up to 220° C. Then, as the underlayers, a 10 nm-thick Cr layer, a 20 nm-thick layer of alloy of Cr containing B in an amount of 0 to 12 at %, and a 5 nm-thick Co-37 at % Cr alloy layer were successively stacked. Subsequently, the magnetic layer and the protective layer were successively formed. As the B-containing Cr alloy, Cr-40 at % Mo-2 at % B, Cr-40 at % Mo-4 at % B, Cr-40 at % Mo-6 at % B, Cr-40 at % Mo-8 at % B, Cr-40 at % Mo-10 at % B, or Cr-40 at % Mo-12 at % B was used. As a comparative example, a medium using a Cr-40 at % Mo alloy was manufactured. The layer configuration of the magnetic layer and the Ru intermediate layer was the same as that of the medium of the sample No. 214. In each of the media of this example, the Al—Mg substrate is used. Therefore, the first underlayer for causing the Cr alloy to be (100)-oriented is not formed. Further, in order to ensure the compatibility between the intensive (100) orientation and the microfine crystal grains, the second underlayer made of the Cr alloy was so configured as to have a double layered structure.

The X-ray diffraction measurement of each of the media of this example was carried out. As a result, for all the media other than the medium using the Cr-40 at % Mo-12 at % B underlayer, there were observed the diffraction peaks from the (100) planes of Cr and the CrMoB alloy underlayers, and intensive diffraction peaks from the (11.0) planes of the third underlayers and the magnetic layers. For the medium using the Cr-40 at % Mo-12 at % B underlayer, the diffraction peak from the (11.0) plane of the magnetic layer was very weak, and an intensive (00.2) peak was observed. This has indicated that, for the medium using the Cr-40 at % Mo-12 at % B underlayer, the in-plane component of the c-axis is reduced.

FIGS. 5(A) and 5(B) show the relationships of the B concentration of the CrMoB underlayer with the coercivity Hc, and the normalized media noise Nd/So, respectively. Herein, the normalized media noise is the value evaluated by using the same magnetic head as in Example 1. The coercivity Hc decreases with an increase in B content, and sharply decreases over a range of 10 at % to 12 at %. On the other hand, the normalized media noise Nd/So once decreases with an increase in B content, becomes minimum with respect to the B content of 6 at % to 8 at %, and then sharply increases. This has indicated as follows. Namely, in order to obtain a medium having a high coercivity of 240 kA/m or more and a low media noise of 0.04 $\mu$Vrms/$\mu$Vpp or less, it is desirable that the B content of the CrMoB alloy underlayer is set at 2 at % to 10 at %.

EXAMPLE 11

Out of the magnetic recording media 91 described in Examples 1 to 10, the media of the sample Nos. 113, 208, 213, 304, 404, 511, 609, 703, and 802, the medium shown in Example 9, and the medium using the Cr-40 at % Mo-8 at % B underlayer in Example 10 were selected. Then, a magnetic storage apparatus was configured as shown in FIG. 6, which had each of these media, a driver 92 for driving the magnetic recording medium, a magnetic head 93 made up of a write element and a read element, a means 94 for causing the magnetic head to perform relative movement with respect to the magnetic recording medium, and a read/write signal processing means 95 for performing the signal input to the magnetic head and the output signal read-back from the magnetic head, and a station unit 96 for shelter during unloading.

Figure 7:
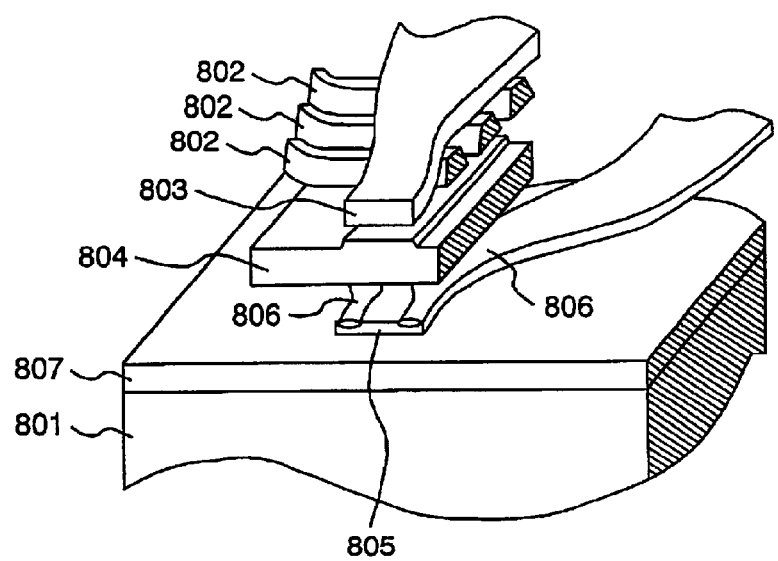
FIG. 7 is a perspective view showing one example of the cross sectional structure of a magnetic head in the magnetic storage apparatus of the present invention.

The read element of the magnetic head was made up of a magnetoresistive head. FIG. 7 is a schematic perspective view showing the configuration of the magnetic head. This head is a composite head having both the inductive head for writing and the magnetoresistive head for reading formed on a substrate 801. The writing head is made up of an upper magnetic pole 803 and a lower magnetic pole-cum-upper shield layer 804 with a coil 802 interposed therebetween. The gap length between the magnetic poles was set at 0.14 $\mu$m. Further, a 1.5 $\mu$m-thick copper wire was used for the coil. The reading head was made up of a magnetoresistive sensor 805 and electrode patterns 806 on opposite sides thereof. The magnetoresistive sensor was interposed between the lower magnetic pole-cum-upper shield layer 804 and a lower shield layer 807. The distance between the two shield layers was set at 0.10 $\mu$m. Incidentally, in this figure, the gap layer between the magnetic poles and the gap layer between the shield layer and the magnetoresistive sensor are omitted.

Figure 8:
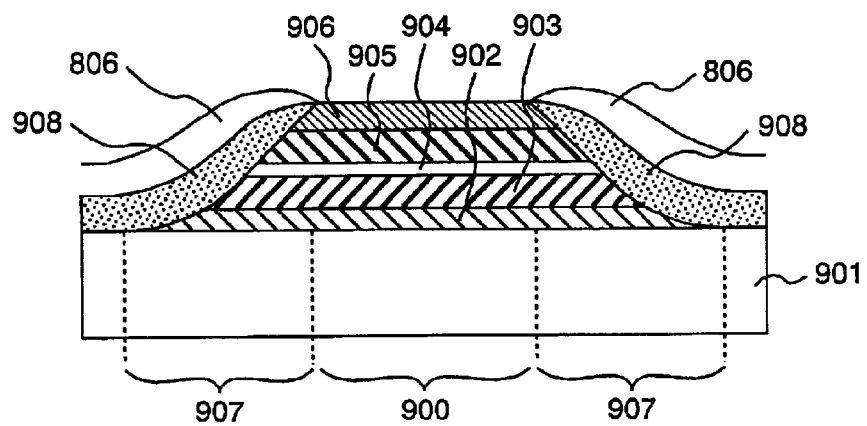
FIG. 8 is a schematic diagram showing one example of the cross sectional structure of a magnetoresistive sensor unit of the magnetic head in the magnetic storage apparatus of the present invention.

FIG. 8 shows the cross sectional configuration of the magnetoresistive sensor. A signal sensing region 900 of the magnetic sensor is configured with a magnetoresistive sensor (spin-valve type read element) including a plurality of conductive magnetic layers of which mutual magnetization directions relatively change due to the external magnetic field, thereby generating a large resistance change, and conductive non-magnetic layers disposed each between the conductive magnetic layers. This magnetic sensor is so configured that on a gap layer 901, a Ta buffer layer 902, a lower magnetic layer 903, an intermediate layer 904 configured with copper, an upper magnetic layer 905, and an anti-ferromagnetic layer 906 made of a Pt—Mn alloy are successively formed. A Ni-20 at % Fe alloy was used for the lower magnetic layer, and cobalt was used for the upper magnetic layer. The magnetization of the upper magnetic layer is fixed in one direction due to the exchange field from the anti-ferromagnetic layer. In contrast, the direction of the magnetization of the lower magnetic layer in contact with the upper magnetic layer via the non-magnetic layer is changed due to the leakage field from the magnetic recording medium, so that the resistance change occurs. There are tapered regions 907 each processed in tapered form on opposite sides of the signal sensing region. The tapered regions are made up of permanent magnet layers 908 for converting the lower magnetic layer into a single domain, and a pair of electrodes 806 for taking a signal formed thereon. The permanent magnet layer is required to have a large coercivity and have a magnetization direction not changing with ease. For this reason, a Co—Cr—Pt alloy was used.

Out of the magnetic recording media 91 described in Examples 1 to 8, the media of the sample Nos. 113, 208, 213, 304, 404, 511, 609, 703, and 802, the medium shown in Example 9, and the medium using the Cr-40 at % Mo-8 at % B underlayer in Example 10 were selected. Then, each medium was used in combination with the head shown in FIG. 7 to configure the magnetic storage apparatus shown in FIG. 6. By the magnetic storage apparatus configured in this manner even if any of the media was used, it was possible to achieve a recording density of 50 Mbit/mm$^2$ or more.

In this example, there was used a magnetic head in which the magnetoresistive head was formed on the magnetic head slider having an air bearing surface rail area of 1.4 mm$^2$ or less and a mass of 2 mg or less. By setting the area of the air bearing surface rail of the slider at 1.4 mm$^2$ or less, and further setting the mass at 2 mg or less, it was possible to improve the shock resistance reliability. In consequence, it was possible to ensure the compatibility between the high recording density and the high shock resistance. Accordingly, it was possible to implement a mean time The magnetic recording medium of the present invention has effects of reducing the media noise and improving the stability against the thermal fluctuation. By using the magnetic recording medium of the present invention and the magnetoresistive head, it becomes possible to implement a magnetic storage apparatus having an areal recording density of 50 Mbit/mm$^2$ or more, and a mean time between failures of 300,000 hours or more.

What is claimed is:

1. A longitudinal magnetic recording medium, comprising:
   a non-magnetic substrate;
   a plurality of underlayers formed on the non-magnetic substrate; and
   a magnetic layer formed on the non-magnetic substrate via the plurality of the underlayers, the magnetic layer comprising:
   a lower magnetic layer containing at least in an amount of not less than 3 at % to not more than 30 at %, and Cr in an amount greater than 0 at % to not more than 18 at %, and further containing at least one of B or C in an amount greater than 0 at % to not more than 20 at %, and the balance being made up of Co, and
   an upper magnetic layer containing Co as a main component, anti-ferromagnetically coupled with the lower magnetic layer via a non-magnetic intermediate layer.

2. The longitudinal magnetic recording medium according to claim 1, wherein the plurality of the underlayers comprise a non-magnetic and amorphous structured first underlayer containing Co or Ni as a main component, and a body-centered cubic structured second underlayer containing Cr.

3. The longitudinal magnetic recording medium according to claim 1, wherein the plurality of the underlayers comprise a first underlayer having a B2 structure, and a body-centered cubic structured second underlayer containing Cr.

4. The longitudinal magnetic recording medium according to claim 1, wherein at least one layer of the plurality of the underlayers is made of a non-magnetic and hexagonal close-packed structured alloy material containing Co.

5. The longitudinal magnetic recording medium according to claim 4, wherein the underlayer made of the non-magnetic and hexagonal close-packed structured alloy material containing Co is formed between the lower magnetic layer and the second underlayer.

6. A longitudinal magnetic recording medium comprising:
   a non-magnetic substrate;
   a plurality of underlayers formed on the non-magnetic substrate; and
   a magnetic layer formed on the non-magnetic substrate via the plurality of the underlayers, the magnetic layer comprising:
   a lower magnetic layer containing at least one of Ru or Re in an amount of not less than 3 at % to not more than 30 at %, and Cr in an amount greater than 0 at % to not more than 18 at %, and further containing at least one of B or C in an amount greater than 0 at % to not more than 20 at %, and the balance being made up of Co, and
   an upper magnetic layer containing Co as a main component, anti-ferromagnetically coupled with the lower magnetic layer via a non-magnetic intermediate layer, wherein, at least one layer of the plurality of the underlayers is made of a non-magnetic and hexagonal close-packed structured alloy material containing Co, and
   wherein the underlayer made of the non-magnetic and hexagonal close-packed structured alloy material containing Co is made of a Co—Ru alloy containing Ru in an amount of not less than 35 at % to not more than 60 at %.

7. A longitudinal magnetic recording medium comprising:
   a non-magnetic substrate;
   a plurality of underlayers formed on the non-magnetic substrate; and
   a magnetic layer formed on the non-magnetic substrate via the plurality of the underlayers, the magnetic layer comprising:
   a lower magnetic layer containing at least one of Ru or Re in an amount of not less than 3 at % to not more than 30 at %, and Cr in an amount greater than 0 at % to not mote than 18 at %, and further containing at least one of B or C in an amount greater than 0 at % to not more than 20 at %, and the balance being made up of Co, and
   an upper magnetic layer containing Co as a main component, anti-ferromagnetically coupled with the lower magnetic layer via a non-magnetic intermediate layer wherein,
   at least one layer of the plurality of the underlayers is made of a non-magnetic and hexagonal close-packed structured alloy material containing Co, and
   wherein the underlayer made of the non-magnetic and hexagonal close-packed structured alloy material containing Co is formed between the lower magnetic layer and the second underlayer,
   wherein the underlayer made of the non-magnetic and hexagonal close-packed structured alloy material containing Co is formed between the magnetic layer and the second underlayer, and the underlayer made of the non-magnetic and hexagonal close-packed structure alloy material containing Co is made of a Co—Ru alloy containing Ru in an amount of not less than 35 at % to not more than 60 at %.

8. A longitudinal magnetic recording medium comprising:
   a non-magnetic substrate;
   a plurality of underlayers formed on the non-magnetic substrate;
   a magnetic layer formed on the non-magnetic substrate via the plurality of the underlayers, the magnetic layer comprising:
   a lower magnetic layer containing at least one of Ru or Re in an amount of not less than 3 at % to not more than 30 at %, and Cr in an amount greater than 0 at % to not more than 18 at %;
   further containing at least one of B or C in an amount greater than 0 at % to not more than 20 at %, and the balance being made up of Co; and
   an upper magnetic layer containing Co as a main component, anti-ferromagnetically coupled with the lower magnetic layer via a non-magnetic intermediate layer,
   wherein the plurality of the underlayers comprises a non-magnetic and amorphous structured first underlayer containing Co or Ni as a main component, and a body-centered cubic structured second underlayer containing Cr, and wherein at least one layer of the plurality of the underlayers is made of a body-centered cubic structured alloy material containing Cr, and the Cr alloy contains B in an amount of not less than 2 at % to not more than 15 at %.

9. A longitudinal magnetic recording medium comprising:
a non-magnetic substrate;
a plurality of underlayers formed on the non-magnetic substrate;
a magnetic layer formed on the non-magnetic substrate via the plurality of the underlayers, the magnetic layer comprising:
a lower magnetic layer containing at least one of Ru or Re in an amount of not less than 3 at % to not more than 30 at %, and Cr in an amount greater than 0 at % to not more than 18 at %;
further containing at least one of B or C in an amount greater than 0 at % to not more than 20 at %, and the balance being made up of Co; and
an upper magnetic layer containing Co as a main component, anti-ferromagnetically coupled with the lower magnetic layer via a non-magnetic intermediate layer,
wherein the plurality of the underlayers comprise a non-magnetic and amorphous structured first underlayer containing Co or Ni as a main component, and a body-centered cubic structured second underlayer containing Cr, and
wherein at least one layer of the plurality of the underlayers is made of a body-centered cubic structured alloy material containing Cr, and the Cr alloy contains B in an amount of not less than 2 at % to not more than 15 at %.

10. A longitudinal magnetic recording medium comprising:
a non-magnetic substrate;
a plurality of underlayers formed on the non-magnetic substrate;
a magnetic layer formed on the non-magnetic substrate via the plurality of the underlayers, the magnetic layer comprising:
a lower magnetic layer containing at least one of Ru or Re in an amount of not less than 3 at % to not more than 30 at %, and Cr in an amount greater than 0 at % to not more than 18 at %;
further containing at least one of B or C in an amount greater than 0 at % to not more than 20 at %, and the balance being made up of Co; and
an upper magnetic layer containing Co as a main component, anti-ferromagnetically coupled with the lower magnetic layer via a non-magnetic intermediate layer,
wherein the plurality of the underlayers comprise a non-magnetic and amorphous structured first underlayer containing Co or Ni as a main component, and a body-centered cubic structured second underlayer containing Cr,
wherein the plurality of the underlayers comprise a first underlayer having a B2 structure, and a body-centered cubic structured second underlayer containing Cr, and
wherein at least one layer of the plurality of the underlayers is made of a body-centered cubic structured alloy material containing Cr, and the Cr alloy contains B in an amount of not less than 2 at % to not more than 15 at %.

11. A magnetic storage apparatus, having:
a magnetic recording medium, a driver for driving it in the recording direction, a composite head having an inductive magnetic head for recording and a spin-valve type magnetic head for reading in combination, a means for causing the head to perform relative movement with respect to the medium, and a read/write signal processing means with respect to the head; wherein
the magnetic recording medium, comprising:
a non-magnetic substrate;
a plurality of underlayers formed on the non-magnetic substrate; and
a magnetic layer formed on the non-magnetic substrate via the plurality of the underlayers, the magnetic layer including a lower magnetic layer containing at least in an amount greater than 3 at % to not more than 30 at %, and Cr in an amount greater than 0 at % to not more than 18 at %, and further containing at least one of B or C in an amount greater than 0 at % to not more than 20 at %, and the balance being made up of Co, and an upper magnetic layer containing Co as a main component, anti-ferromagnetically coupled with the lower magnetic layer via a non-magnetic intermediate layer, and
the plurality of the underlayers comprising a non-magnetic and amorphous structured first underlayer containing Co or Ni as a main component, and a body-centered cubic structured second underlayer containing Cr.

12. The magnetic storage apparatus according to claim 11, wherein the plurality of the underlayers of the magnetic recording medium comprise a first underlayer having a B2 structure, and a body-centered cubic structured second underlayer containing Cr.

13. The magnetic storage apparatus according to claim 11, wherein at least one layer of the plurality of the underlayers of the magnetic recording medium is made of a non-magnetic and hexagonal close-packed structured alloy material containing Co.

14. The magnetic storage apparatus according to claim 13, wherein the underlayer made of the non-magnetic and hexagonal close-packed structured alloy material containing Co of the magnetic recording medium is formed between the lower magnetic layer and the second underlayer.

15. A magnetic storage apparatus according to claim 13, having:
a magnetic recording medium, a driver for driving it in the recording direction, a composite head having an inductive magnetic head for recording and a spin-valve type magnetic head for reading in combination, a means for causing the head to perform relative movement with respect to the medium, and a read/write signal processing means with respect to the head; wherein
the magnetic recording medium, comprising:
a non-magnetic substrate;
a plurality of underlayers formed on the non-magnetic substrate; and
a magnetic layer formed on the non-magnetic substrate via the plurality of the underlayers, the magnetic layer including a lower magnetic layer containing at least one of Ru or Re in an amount of not less than 3 at to not more than 30 at %, and Cr in an amount greater than 0 at % to not more than 18 at %, and further containing at least one of or C in an amount greater than 0 at % to not more than 20 at %, and the balance being made up of Co, and an upper magnetic layer containing Co as a main component, anti-ferromagnetically coupled with the lower magnetic layer via a non-magnetic intermediate layer, and the plurality of the underlayers comprising a non-magnetic and amorphous structured first underlayer containing Co or Ni as a main component, and a body-centered cubic structured second underlayer containing Cr, and wherein at least one layer of the plurality of the underlayers of the magnetic recording medium is made of a non-magnetic and hexagonal close-packed structured alloy material containing Co, and, wherein the underlayer made of the non-magnetic and hexagonal close-packed structured alloy material containing Co of the magnetic recording medium is made of a Co—Ru alloy containing Ru in an amount of not less than 35 at % to not more than 60 at %.

16. A magnetic storage apparatus, having:

a magnetic recording medium, a driver for driving it in the recording direction, a composite head having an inductive magnetic head for recording and a spin-valve type magnetic head for reading in combination, a means for causing the head to perform relative movement with respect to the medium, and a read/write signal processing means with respect to the head; wherein the magnetic recording medium, comprising:

a non-magnetic substrate;

a plurality of underlayers formed on the non-magnetic substrate; and a magnetic layer formed on the non-magnetic substrate via the plurality of the underlayers, the magnetic layer including a lower magnetic layer containing at least one of Ru or Re in an amount of not less than 3 at % to not more than 30 at %, and Cr in an amount greater than 0 at % to not more than 18 at %, and further containing at least one of B or C in an amount greater than 0 at % to not more than 20 at %, and the balance being made up of Co, and an upper magnetic layer containing Co as a main component, anti-ferromagnetically coupled with the lower magnetic layer via a non-magnetic intermediate layer, and the plurality of the underlayers comprising a non-magnetic and amorphous structured first underlayer containing Co or Ni as a main component, and a body-centered cubic structured second underlayer containing Cr, wherein at least one layer of the plurality of the underlayers of the magnetic recording medium is made of a body-centered cubic structured alloy material containing Cr, and the Cr alloy contains B in an amount of not less than 2 at % to not more than 15 at %.

17. A longitudinal magnetic recording medium according to claim 4, wherein the underlayer made of the non-magnetic and hexagonal close-packed structured alloy material containing Co is made of a Co—Ru alloy containing Ru in an amount of not less than 35 at % to not more than 60 at %.

18. A longitudinal magnetic recording medium according to claim 5, wherein the underlayer made of the non-magnetic and hexagonal close-packed structured alloy material containing Co is made of Co—Ru alloy containing Ru in an amount of not less than 35 at % to not more than 60 at %.

19. A longitudinal magnetic recording medium according to claim 1, wherein at least one layer of the plurality of the underlayers is made of a body-centered cubic structured alloy material containing Cr, and the Cr alloy contains B in an amount of not less than 2 at % to not more than 15 at %.

20. A longitudinal magnetic recording medium according to claim 2, wherein at least one layer of the plurality of the underlayers is made of a body-centered cubic structured alloy material containing Cr, and the Cr alloy contains B in an amount of not less than 2 at % to not more than 15 at %.

21. A longitudinal magnetic recording medium according to claim 3, wherein at least one layer of the plurality of the underlayers is made of a body-centered cubic structured alloy material containing Cr, and the Cr alloy contains B in an amount of not less than 2 at % to not more than 15 at %.

22. The magnetic storage apparatus according to claim 13, wherein the underlayer made of the non-magnetic and hexagonal close-packed structured alloy material containing Co of the magnetic recording medium is made of a Co—Ru alloy containing Ru in an amount of not less than 35 at % to not more than 60 at %.

23. The magnetic storage apparatus according to claim 11, wherein at least one layer of the plurality of the underlayers of the magnetic recording medium is made of a body-centered cubic structured alloy material containing Cr, and the Cr alloy contains B in an amount of not less than 2 at % to not more than 15 at %.

* * * * *